United States Patent Office 2,809,964
Patented Oct. 15, 1957

2,809,964

PROCESS OF PREPARING LOWER ALKYL SUBSTITUTED AMINOAZOANILINES

Alois C. Baggenstoss, Castleton, and Lester N. Stanley, Delmar, N. Y., assignors to General Aniline & Film Corporation, New York, N. Y., a corporation of Delaware No Drawing. Application July 2, 1953,
Serial No. 365,767

5 Claims. (Cl. 260—205)

This invention relates to the preparation of lower alkyl substituted aminoazoanilines, and particularly, to an improved process of preparing the same.

There are three generally accepted processes available for the manufacture of o- and m-aminoazoatoluene which is utlized as an intermediate in the preparation of aminodisazo dyes. The first or one step reaction method involves treating a solution of toluidine in one-half of its equivalent of hydrochloric acid with a cold solution of sodium nitrite. Diazotization, coupling and isomerization all take place in the one reaction mixture. The chief disadvantage is the production of aminoazotoluene having a high degree of impurity, thus giving dull shades in the final dyestuffs.

The second or two step process, involves first diazotizing toluidine hydrochloride with sodium nitrite to form the diazonium compound. An acid solution of toluidine is added to the diazonium compound and coupled on addition of alkali, e. g. ammonia. The resulting diazoaminotoluene is isolated by filtration and then isomerized by heating with a large excess of toluidine. The products do not have a high degree of purity. Also by employing several steps the process is somewhat more expensive.

The third process, which is generally used, employs the first process, the one step reaction, with a modification wherein a lower alkyl alcohol is present as a solvent-diluent during the diazotization-isomerization. One disadvantage is the tendency of the intermediary diazoamino compound to decompose in the presence of the solvent. To hold this to a minimum it is absolutely imperative that the diazotization-isomerization be carried out for a period of time not exceeding 45 minutes from the time of the addition of the diazotization agent. Although the diazotization period in this reaction is relatively short and the diazotization-isomerization reaction is conducted in the presence of alcohol, nevertheless considerable amounts of tars are found in the aminoazotoluene which results in dull shades in the final dyes.

I have discovered that the shortcomings of the foregoing processes can be readily overcome by modifying the one step reaction in which o- or m-toluidine or o- or m-ethylaniline is slowly diazotized in aqueous acid and slowly isomerized during a period of time ranging from 10-25 hours whereby the product is isolated by treatment with alkali and sufficient solvent to dissolve the product, separated and precipitated as a salt. The unexpected feature of this modification is that the solvent keeps in solution the tars and other by-products which otherwise impair the quality of the product.

The critical distinction between the process of the present invention and that of the third process is that in the former a solvent is employed during isolation of the final product and in the latter as a solvent-diluent during the diazotization-isomerization reaction.

In practising the present invention a stoichiometrical equivalent of o- or m-toluidine or o- or m-ethylaniline is dissolved in one-half of its equivalent of either hydrochloric, sulfuric, acetic or phosphoric acid. Approximately ⅐ part by weight of an inert salt such as sodium or potassium chloride, sodium or potassium carbonate, or sodium or potassium sulfate based on the weight of the toluidine or aniline employed is usually added to the solution. The addition of a salt is necessary if the solvent used is normally water miscible, the presence of the salt causing separation into aqueous-solvent layers; however, when a normally water immiscible solvent is employed, the salt may be omitted. During a period ranging from 10-15 hours nitrite is added with stirring, at a temperature of about 0°-27° C. and preferably as a solution, in an amount sufficient to diazotize one-half the toluidine or aniline present. In order to insure complete diazotization of half the toluidine or aniline, a slight excess may be added. After the addition of sodium nitrite has been completed, the temperature is allowed to rise to about 30-40° C. The charge is maintained at this temperature range with stirring for about 3-6 hours. A sufficient amount of solvent is then added, so as to dissolve all of the aminoazotoluene or aminoazoaniline, usually about 2 to 3½ parts by volume to 1 part by weight of the toluidine or aniline employed, the temperature raised to about 65-75° C. and sufficient alkali is added to neutralize the acid. After settling, the aqueous layer is drawn off and the aminoazotoluene or aminoazoaniline converted to a salt, usually as the hydrochloride, sulfate, nitrate, or phosphate by the addition of the respective acid. It is then cooled to room temperature and the salt, which is essentially insoluble in the solvent, is filtered off leaving the tarry impurities in solution in the mother liquor. The final product has sufficiently high purity to be employed in dye synthesis. However, in cases where it is desired to employ an aminoazotoluene or an aminoazoaniline of a higher degree of purity, additional washings with a solvent may be resorted to followed by drying. The yield of the final product is approximately 90% based on the toluidine or aniline employed.

It is to be noted that the solvents which we employ must have three qualifications. The first is that it must be capable of dissolving the aminoazotoluene and aminoazoaniline. The second qualification is that it must be immiscible with water under the conditions of the treatment. This does not mean that a water immiscible solvent is necessarily required. All it means is that under the conditions of the treatment, wherein a salt is present, that a water and solvent layer are formed. As examples of such solvents we can employ propanol, isopropanol, butanol, isobutanol, n-amyl alcohol, 2-pentanol, hexanol, ethylene glycol, glycol methyl ether, glycol ethyl ether, chlorobenzene, dichloroethane, carbon tetrachloride, toluene, xylene and the like. However, due to its low cost, ready commercial availability, and its unique effectiveness, we prefer to employ isopropanol.

It is to be further noted that by the term "lower alkyl substituted aminoanilines" as employed herein and in the appended claims, we intend the term to include only o-toluidine, m-toluidine, o-ethylaniline, and m-ethylaniline.

The following examples will described in detail the precise steps in obtaining aminoazotoluenes and aminoazoanilines of improved quality.

*Example I*

43 grams of o-toluidine are dissolved in 23 cc. of hydrochloric acid 20° Bé. to which are then added 6 grams of sodium chloride. To this solution is added very slowly and regularly over a period of time ranging from 13-14 hours and with continuous stirring a nitrite solution containing 14 grams of sodium nitrite per 30 cc. of water. The temperature during diazotization reaction is maintained at about 27° C. After the end of the fourteenth hour, the temperature of the diazotized reaction mixture is allowed to rise slightly to about 32° C. and the mixture maintained at this temperature with stirring for about 6 hours. Thereafter 140 cc. of isopropanol are added, the temperature raised to about 70° C., and 2 cc. of 30% aqueous solution of caustic soda added. After settling, the aqueous layer is drawn off and the isopropanol layer containing the aminoazotoluene is converted to the sulfate by the addition of the required amount of sulfuric acid. The solution is then cooled and the aminoazotoluene sulfate, which is substantially insoluble in the isopropanol solution is filtered off leaving the tarry impurities in solution in the isopropanol.

*Example II*

Example I was repeated with the exception that 43 grams of o-toluidine were replaced by an equivalent amount of m-toluidine, and isopropanol was replaced by an equivalent volume of glycol ethyl ether.

*Example III*

204 grams of o-ethylaniline were cooled to 0° C., and 85 cc. of 31.5% concentration of hydrochloric acid added, followed by the addition of 25 grams of sodium chloride. Over a period of about 15 hours, there were added 143 cc. of sodium nitrite as a 31.5% aqueous solution at a temperature of 20–22° C. The temperature was allowed to rise to about 36° C. during a period of about 5 hours. Thereafter 100 cc. of caustic soda solution of 30% concentration were added together with 500 cc. of isopropanol. The solvent layer was separated and the azo compound precipitated by the addition of 90 cc. of 31.5% concentration of hydrochloric acid, filtered and washed with isopropanol.

*Example IV*

Example 3 was repeated with the exception that 204 grams of o-ethylaniline were replaced by an equivalent amount of m-ethylaniline, and isopropanol was replaced by an equivalent volume of carbon tetrachloride.

We claim:
1. The process of preparing lower alkyl substituted aminoazoanilines which comprises slowly diazotizing a lower alkyl substituted aniline in acid solution at a temperature ranging from 0°–27° C. until diazotization is complete, raising the temperature of the diazotized aniline not to exceed 40° C. and maintaining said temperature for about 3–6 hours, adding an inert solvent, for the aminoazoaniline which solvent is immiscible with the aqueous layer, raising the temperature to about 65–75° C., isolating the product by treatment with alkali followed by the separation of the aqueous layer and precipitation of the aminoazoaniline as a salt from the solvent layer.

2. The process according to claim 1 wherein the lower alkyl substituted aniline is o-toluidine.

3. The process according to claim 1 wherein the lower alkyl substituted aniline is m-toluidine.

4. The process according to claim 1 wherein the lower alkyl substituted aniline is o-ethylaniline.

5. The process according to claim 1 wherein the lower alkyl substituted aniline is m-ethylaniline.

References Cited in the file of this patent
UNITED STATES PATENTS

| | | |
|---|---|---|
| 2,346,508 | Richardson | Jan. 11, 1944 |
| 2,538,431 | Shulman | Jan. 16, 1951 |